April 26, 1949.　　　　J. PILCH　　　　2,468,511
CYLINDER AND PISTON ASSEMBLY FOR
HYDRAULIC APPARATUS
Filed Sept. 10, 1947
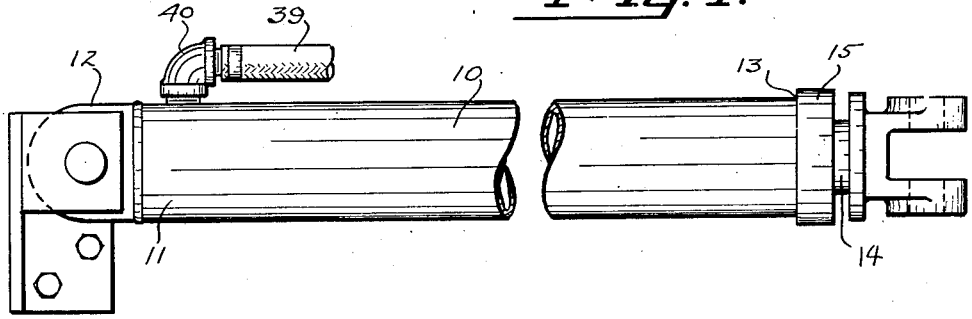
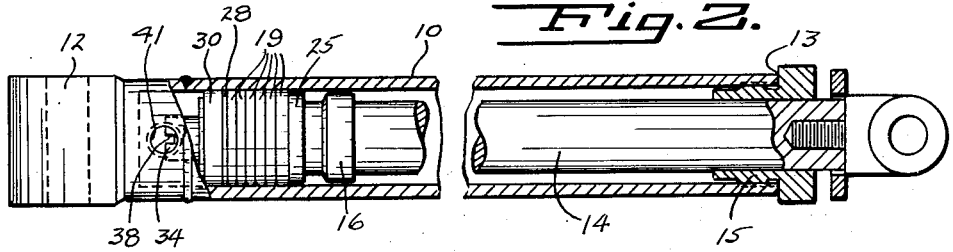
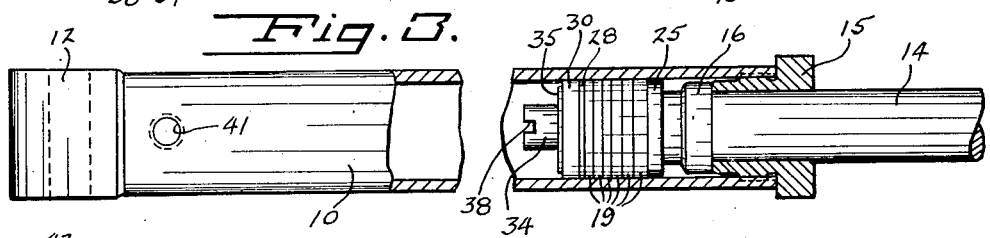
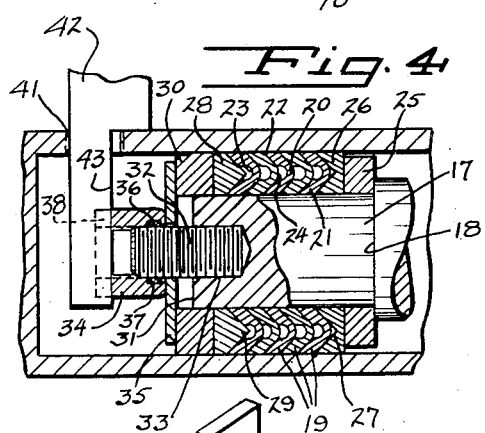
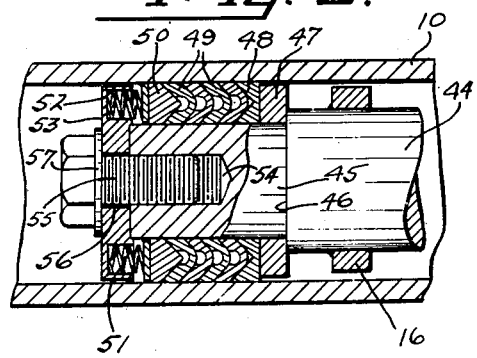
INVENTOR.
JOHN PILCH
BY
ATTORNEY.

Patented Apr. 26, 1949

2,468,511

UNITED STATES PATENT OFFICE 2,468,511

CYLINDER AND PISTON ASSEMBLY FOR HYDRAULIC APPARATUS

John Pilch, Ware, Mass.

Application September 10, 1947, Serial No. 773,198

1 Claim. (Cl. 309—29)

This invention relates to hydraulic apparatus and especially to a cylinder and piston assembly for such apparatus.

An object of the invention is to provide a piston with an adjustable diameter so that wear against the walls of the cylinder may be compensated for.

Another object of the invention is to provide a piston in which the outer diameter is automatically adjusted so as to compensate for wear.

Still another object of the invention is to provide a piston and cylinder assembly in which the diameter of the piston may be adjusted without removing the piston from the cylinder.

Other objects will be apparent as the description of the invention proceeds.

The invention is illustrated in the accompanying drawings, in which:

Fig. 1 is a side elevational view of a hydraulic cylinder embodying the invention;

Fig. 2 is a plan view, partly in section, of the cylinder of Fig. 1, showing the piston therein;

Fig. 3 is a similar view showing the piston at the other limit of its stroke;

Fig. 4 is an enlarged sectional elevational view of a portion of the cylinder of Figs. 1 to 3 showing the manner of making the adjustment;

Fig. 5 is a perspective view of a tool used in making the adjustment; and

Fig. 6 is a sectional elevational view of a portion of a modified form of cylinder and piston assembly.

Referring now more specifically to Figs. 1 to 4 the usual form of hydraulic cylinder 10 is shown having a closed end 11 with a suitable extension 12 for attaching that end to a support and an open end 13 through which the end of a piston rod 14 protrudes. A bearing sleeve 15 surrounds the piston rod 14 and is screwed into the end 13 of the cylinder and permits reciprocation of the rod in the cylinder. A collar 16 is provided on the rod to prevent the rod from being withdrawn too far out of the cylinder.

The rod 14 has a portion 17 near the inner end thereof which is reduced in diameter, forming a shoulder 18 which forms a backing for a plurality of packing washers 19 surrounding the portion 17.

Each of the washers 19 may be made of material usually selected for that purpose, such as a fibrous material impregnated with graphite, and is stiff enough to be self supporting though flexible enough so that its shape can be altered. In order to be able to adjust the diameter of the washers I prefer to use a washer which has a mid-portion 20 which is displaced from a plane extending through the inner and outer rims 21 and 22, respectively. Such a washer is substantially V-shaped in cross section, having a curved inner vertex 23 and a beaded outer vertex 24 to permit flexing of the washer about the vertex and prevent splitting along the vertex.

A metal washer 25 is provided around the portion 17 of the rod 14 against the shoulder 18 and a backing washer 26 whose diameter is slightly smaller than the inside of the cylinder 10 is provided around the portion 17 against the washer 25. The backing washer 26 is substantially flat on the side towards the washer 25 and has a V-shaped groove 27 around the other side to accommodate the displaced mid-portion of the first of the packing washers 19. At the other end of the plurality of packing washers 19 I position another backing washer 28 having a projecting ridge 29, V-shaped in cross section, extending around the side towards the packing washers with the ridge inserted in the concavity between the inner and outer rims of the last of the packing washers.

The backing washer 28 is freely slidable on the portion 17 of the rod 14 and may be held against the packing washers by a washer 30 which overhangs the shoulder 31 formed by the end of the rod. A stud 32 is screwed into a threaded hole 33 in the end of the rod. A nut 34 is threaded on the stud 32 and acts as a stop for the washer 30 and convex backing washer 28, a suitable thin washer 35 of large enough diameter to extend over the washer 30 being provided between the latter washer and the nut.

The nut 34 is provided with any suitable means for holding it frictionally against rotation on the stud, so as to prevent its turning in use but permitting turning by the use of a tool when adjustment of the diameter of the piston is necessary. Such means may be the frictional inset 36 which is shown in a groove 37 around the inner tapped surface of the nut.

The nut 34 has a slot 38 extending diametrically across the outer end thereof for the purpose of holding the nut against turning when adjustment is to be made.

Fluid under pressure is introduced into the closed end of the cylinder through a pipe 39 and associated connections 40 which are screwed into a tapped hole 41 in the cylinder, and it will be seen that the rims of the packing washers 19 lean towards the pressure end of the cylinder in accordance with the usual practice in the hydraulic piston art, so as to cause the packing washers to press more firmly against the cylinder walls when fluid under pressure is forced into the cylinder.

However, in accordance with the present invention, I provide the groove 27 in the backing washer 26 and the projecting ridge 29 of the backing washer 28 with a wider angle than the normal angle of the displaced mid-portions of the packing washers 19. Thus, when these washers are pressed between the backing washers 26 and 28, the tendency is to flatten them out which, of course, would increase the diameter thereof.

The hole 41 in the cylinder is large enough in diameter so as to receive, when the pressure connection is removed, a tool 42 which has a straight edge 43 adapted to fit into the slot 38 in the nut 34.

When it is desired to adjust the diameter of the piston formed by the packing washers 19, the pressure pipe connection 40 is removed and the outer end of the rod 14 disconnected from whatever driven element against which the hydraulic power is exerted in normal use of the apparatus, so that the rod is free to turn in the cylinder. Then the rod is drawn out of the cylinder far enough to permit the insertion of the tool 42 with the straight edge 43 towards the nut 34. The rod is then pushed into the cylinder until the nut 34 engages the edge 43 of the tool and rotated until the slot 38 can be pushed over the edge 43. In this relative position of the nut and tool the nut is held against turning and the rod 14 may then be turned in the proper direction by means of a suitable wrench until enough pressure has been put on the backing washer 28 to increase the diameter of the packing washers 19 sufficiently to take up the wear and make them tight again against the internal walls of the cylinder.

When the adjustment has been made it is only necessary to remove the tool 42, replace the connection 40, and reconnect the outer end of the rod 14 with the driven element, and the hydraulic cylinder assembly is ready for use again.

If desired, a separate tapped hole normally closed by a plug may be provided for inserting the tool.

In Fig. 6 I have shown a modified form of the invention in which the adjustment on the washers is made automatically. In this figure the rod 44 may be similar to the rod 14, having a reduced diameter portion 45 forming a shoulder 46. A washer 47 against the shoulder 46 forms a stop for a concave backing washer 48 and a plurality of packing washers 49 are arranged on the portion 45 with the first against the backing washer 48 and the last against a convex backing washer 50.

All of these washers may be similar to the corresponding washers described in connection with the preceding figures. However, in this case the backing washer 50, although freely slidable on the portion 45 of the rod 44, is resiliently pressed against the packing washers 49 by means of a plurality of coil springs 51 which are mounted in sockets 52 spaced around a circular member 53 mounted at the end of the rod 44.

The extreme end of the rod 44 is provided with a tapped hole 54 into which a stud bolt 55 may be threaded. This passes through a suitable hole 56 in the member 53. A thin washer 57 is placed over the stud bolt 55 between the head of the bolt and the member 53 to hold the whole assembly in place.

The springs 51 exert a constant pressure on the packing washers 49 and the tendency is thus always present to cause their diameters to increase, so that any wear of the washers is automatically compensated for. The compressive strength of the springs may be chosen to give the desired pressure against the packing washers.

Many modifications may be made without departing from the spirit of the invention and I do not therefore desire to limit myself to what has been shown and described except by the limitations included in the appended claim.

Having described my invention, what I claim as new and desire to secure by Letters Patent is:

A hydraulic cylinder and piston assembly comprising a cylinder, a rod extending into said cylinder and arranged for reciprocation therein, a bearing at the end of said cylinder where said rod enters said cylinder, surrounding said rod for permitting reciprocation of said rod in said cylinder, a plurality of juxtaposed packing washers within said cylinder and on said rod adjacent the end thereof, each of said packing washers having a mid-section displaced from the plane of the inner and outer rims thereof with said mid-section nested between the inner and outer rims of the next adjacent washer on that side, means on said rod forming a backing for the first washer of said plurality of washers, a screw threaded end on said rod, a member threaded on said end and forming a backing for the last of said plurality of washers, whereby relative rotation of said rod and member will adjust the distance between said member and said means and therefore the diameter of said nested washers, a slot in said backing member arranged radially of the axis of said rod, said cylinder having a hole in the side wall thereof, and a removable plug in said hole, whereby when said plug is removed a tool may be inserted in said hole to engage said slot so that relative rotation of said member and said backing means may be had by rotating said rod without removing the rod and washer assembly from said cylinder.

JOHN PILCH.

REFERENCES CITED

The following references are of record in the file of this patent:

UNITED STATES PATENTS

| Number | Name | Date |
|---|---|---|
| 984,837 | Morrison | Feb. 21, 1911 |
| 1,974,362 | Marsh | Sept. 18, 1934 |
| 2,188,957 | Pfauser | Feb. 6, 1940 |
| 2,434,063 | Birchfield | Jan. 6, 1948 |